Patented Jan. 9, 1923.

1,441,728

UNITED STATES PATENT OFFICE.

GEORGE H. L. KENT, OF ELIZABETH, NEW JERSEY, ASSIGNOR, BY MESNE ASSIGNMENTS, TO STANDARD DEVELOPMENT COMPANY, OF NEW YORK, N. Y., A CORPORATION OF DELAWARE.

FOAM FOR FIRE PREVENTION.

No Drawing. Application filed December 24, 1921. Serial No. 524,752.

*To all whom it may concern:*

Be it known that I, GEORGE H. L. KENT, a citizen of the United States, residing at 43 Sayre Street, Elizabeth, in the county of Union and State of New Jersey, have invented a new and useful Improvement in Foam for Fire Prevention, of which the following is a specification.

The present invention relates to improvements in foams and foam producing solutions, more particularly for use in forming foam blankets or coverings upon combustible materials in case of fire or danger from fire.

In accordance with the present invention a foam is prepared by admixture of two solutions, at least one of which contains a small proportion, say 2 to 4%, of an alkali-metal salt of a mineral oil sludge sulfonic compound. The foam producing solutions likewise contain suitable proportions of compounds capable of reacting to produce a gas, preferably one incapable of burning or supporting combustion, such as carbon dioxide. Suitable body-forming materials may be incorporated into the foam, either by the addition of body-forming materials such as glue, glucose or the like to one or both the foam producing, or by supplying in the foam suspended, finely dispersed solids, such as clay, calcium sulfate, aluminum or ferrous hydroxide or the like, either by the addition of such materials to either or both foam producing solutions or by incorporating into the foam producing solutions compounds capable of reacting to form them. These compounds incorporated in the foam producing solutions may be those which form the gaseous phase of the form by their interaction.

As an illustration of the production of a foam in accordance with this invention I may employ one solution containing aluminum sulfate, ferrous sulfate or salts of other metals which form hydroxides on reaction with carbonates in solution, such as nickel, cobalt, chromium, etc., and another solution containing a carbonate, for example, sodium bicarbonate and a sodium salt of mineral oil sludge sulfonic compound. By reaction between the solutions carbon dioxide is evolved and a foam of relatively great permanence is formed. Other body-forming ingredients may be added to one or both solutions, such as glue, calcium chloride (which must be added to the sulfate-free solution) and the like. The following specific example further illustrates the present invention.

Two solutions are prepared, one containing, for example, 11% of aluminum sulfate and 89% of water and the other 8 to 10% of sodium bicarbonate, 2 to 4% of sodium salts of sludge sulfonic soaps and the remainder water. These solutions are mixed in substantially equivalent proportions for the production of a foam so that the reaction may be substantially complete. For pumping on open oil tanks, etc., equal volumes of the two solutions may be employed. On mixing the solutions carbon dioxide is evolved and a foam is formed. In some cases it becomes necessary to use the solutions in unequal volumes in which case the proportions of dissolved constituents in the respective solutions are so proportioned that the volumes of the solutions used contain substantially equivalent amounts of the reacting chemicals. Thus in fire extinguishers the proportion of volume of the container for the aluminum sulfate-containing solution to that of the carbonate-containing solution may be as 1 to 4.75. In such case the concentration of aluminum sulfate in the solution containing it is proportionately increased.

If desired, a suitable proportion of glue, say about 1%, may be incorporated in each of the solutions. Other body-forming materials may be incorporated in lieu of glue; for example, 1% of calcium chloride may be incorporated in the foam solution, the proportion of sodium carbonate therein being at the same time proportionately increased. Other suitable compounds may be substituted in whole or in part for the aluminum sulfate; thus 4% of ferrous sulfate may be substituted for an equivalent proportion of the aluminum sulfate.

I claim:

1. A foam having as its continuous phase a liquid containing a salt of a mineral oil sludge-sulfonic-compound.

2. A solution for producing a foam comprising a gas-forming reagent and a salt of a mineral oil sludge sulfonic compound in aqueous solution.

3. A solution for producing a foam comprising a gas-forming reagent, a body-forming material and a salt of a mineral oil sludge sulfonic compound in aqueous solution.

4. A solution for producing a foam comprising sodium bicarbonate and a salt of a mineral oil sludge sulfonic compound in aqueous solution.

5. The process of forming a foam which comprises admixing a solution containing an aluminum salt with a solution of a carbonate, one of said solutions containing a salt of a mineral oil sludge sulfonic compound in aqueous solution.

6. The process of forming a foam which comprises admixing a solution containing an aluminum and a ferrous salt with a solution of a carbonate, one of said solutions containing a salt of a mineral oil sludge sulfonic compounds in aqueous solution.

GEORGE H. L. KENT.